May 9, 1967  J. P. K. FONTAINE ET AL  3,318,616
WEDGE LOCKING DEVICE FOR FIFTH-WHEEL KING PIN
Filed May 5, 1965  4 Sheets-Sheet 1
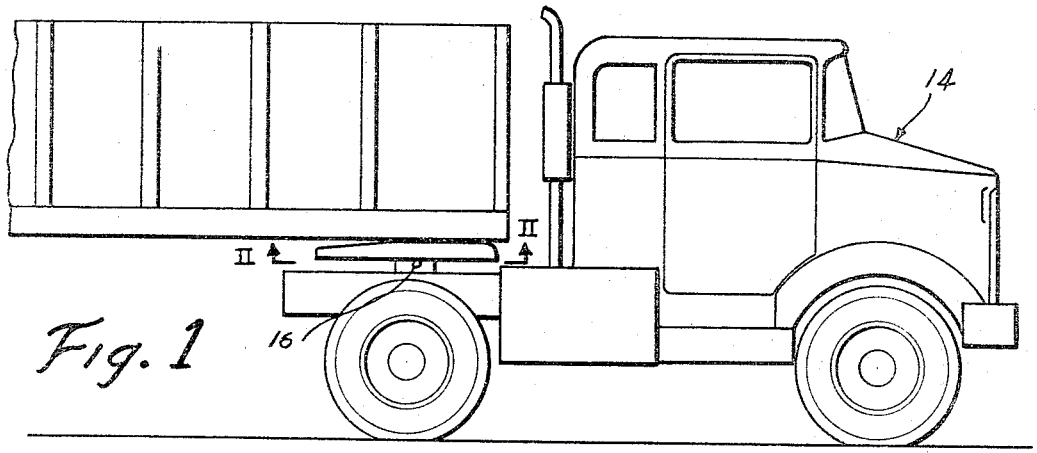
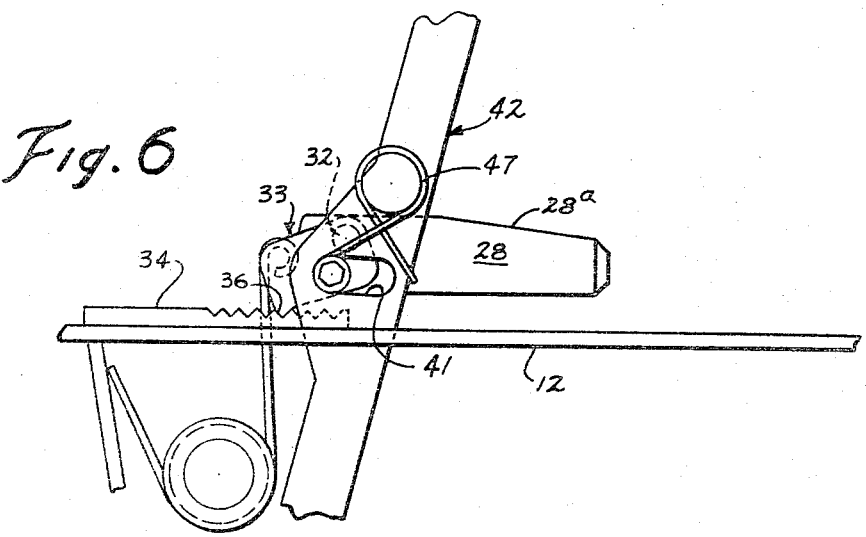
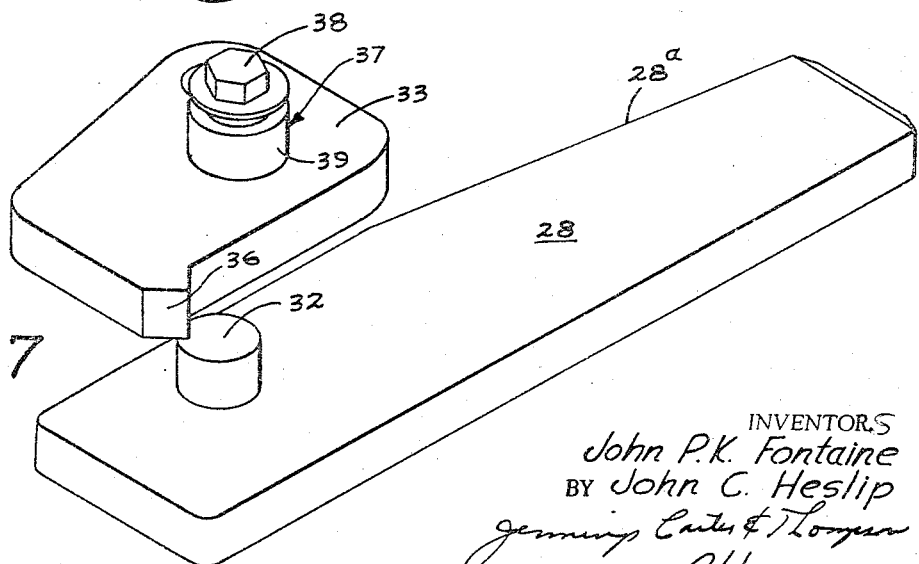
INVENTORS
John P.K. Fontaine
BY John C. Heslip
Jennings Carter & Thompson
Attorneys May 9, 1967 J. P. K. FONTAINE ET AL 3,318,616
WEDGE LOCKING DEVICE FOR FIFTH-WHEEL KING PIN
Filed May 5, 1965 4 Sheets-Sheet 2

INVENTORS
John P.K. Fontaine
BY John C. Heslip
Jennings Carter & Thompson
Attorneys May 9, 1967 J. P. K. FONTAINE ET AL 3,318,616
WEDGE LOCKING DEVICE FOR FIFTH-WHEEL KING PIN
Filed May 5, 1965 4 Sheets-Sheet 3

INVENTORS
John P. K. Fontaine
BY John C. Heslip
Jennings Carter & Thompson
Attorneys INVENTORS
John P. K. Fontaine
BY John C. Heslip
Jennings, Carter & Thompson
Attorneys "# United States Patent Office 3,318,616
Patented May 9, 1967

3,318,616
WEDGE LOCKING DEVICE FOR FIFTH-WHEEL KING PIN
John P. K. Fontaine, 1232 37th Place N., Birmingham, Ala. 35234, and John C. Heslip, Birmingham, Ala.; said Heslip assignor to said Fontaine
Filed May 5, 1965, Ser. No. 453,408
5 Claims. (Cl. 280—434)

This invention relates to fifth wheels of the type embodying a king pin retaining member which is held positively in coupled position by means of a wedge.

In this art it has previously been proposed to provide wedge locking means for holding either a slidable or a rotary king pin retaining member in coupled position. However, insofar as we are aware no one has provided a simple, completely effective means for positively assuring that the wedge itself does not, under load towing conditions, tend to move from its locking position toward unlocking position. In the art this undesirable movement of such a wedge member is called "squirting" of the wedge. Thus, with prior art fifth wheels of this general type, and particularly with such prior art fifth wheels embodying a pivoted as distinguished from a sliding king pin locking member, this defect has caused considerable difficulty. It will be apparent that with any wedge locking member there are certain components of force which tend to cause the wedge to move toward uncoupling position. In the case of the freely rotatable locking member it is furthermore apparent that should the wedge accidentally be forced out of its locking position relative to such member, the king pin is quite free to become disconnected, thus disconnecting the towing vehicle and the trailer or the like.

With a consideration of the foregoing in mind, a prime object of our invention is to provide means for positively locking the wedge member itself into a position which positively holds the king pin locking member in coupled position.

Another object is to provide a fifth wheel in which the said locking member for the wedge is automatically released when the operating handle for moving the wedge toward uncoupling position is moved in that direction, thereby automating the movement of the wedge and the movement of the wedge dog or locking member, all in a single movement of a single operating member or handle.

A more specific object of our invention is to provide a wedge carrying adjacent one end a pivoted locking dog having a detent which is engageable with a rack carried by a frame portion of the fifth wheel, and to connect this pivoted locking dog in lost motion fashion to the operating handle, whereby, upon movement of the handle from coupled to uncoupling position, the first action is to release the dog and the subsequent action, upon continued movement of the handle, is to shift the wedge toward uncoupling position.

A further and more specific object of our invention is to provide the pivoted locking dog, carried by the wedge, with a projection which fits in an elongated slot in the handle, thereby providing the aforesaid lost motion connection, and to make the slot of such length that when the handle is in the coupled position, the end of the slot bears against the projection on the locking dog, thus positively holding the dog itself in locked position in engagement with the rack.

A further object of our invention is to associate with the aforesaid mechanism an improved form of timer bar, which bar is effective automatically to hold the king pin locking member in king pin receiving position so that, in order to reengage the parts to towing position, it is only necessary for the towing vehicle to move into proper relation to the king pin on the trailer or the like, whereby all of the parts, solely by said recoupling action, automatically come to coupled and locked position.

A fifth wheel illustrating features of our invention is shown in the accompanying drawings forming a part of this application in which:

FIG. 1 is a fragmental, side elevational view of a tractor-trailer combination showing our improved fifth wheel applied thereto;

FIG. 6 is a fragmental view, also viewed from beneath the structure, and illustrating particularly the function and construction of the locking dog; and, FIG. 7 is an exploded isometric view of the locking dog and wedge only.

Figure 2:
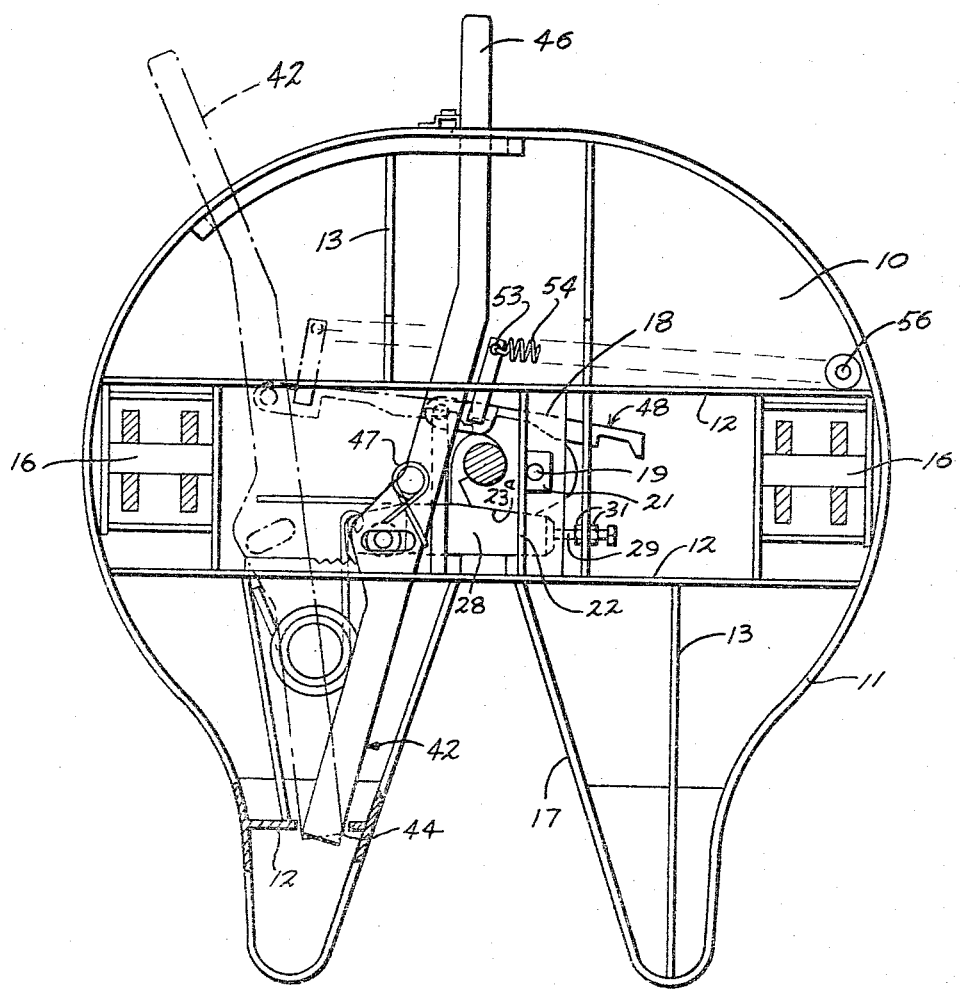
FIG. 2 is an underneath view, drawn to an enlarged scale, certain parts being broken away and in section, and taken generally along line 2—2 of FIG. 1.

Referring now more particularly to FIGS. 1 and 2 of the drawings, our improved fifth wheel comprises the usual upper plate member 10, the usual depending side strengthening members 11 and cross members 12. Longitudinally extending brace plates 13 may also be provided, as is customary. The entire framework thus may conveniently be fabricated of plates, bars, etc. As will be understood the fifth wheel is mounted to the towing vehicle 14 on stub shafts or axles 16 carried by the vericle so that the fifth wheel may rock in a vertical plane about such axes.

The frame is provided with a rearwardly opening, converging slot 17 for receiving the king pin 18 and guiding it into its final position as is understood.

Pivotally mounted as on a pin 19 supported by horizontal plates 21 from a portion of the framework 22 is a king pin locking member 23. As will be understood, the locking member 23 has a seat portion 24 which fits snugly about the king pin 18 when in locked position. It will be understood that the edge 26 of the locking member 23 contacts a stop 27 when in locking position thus to prevent forward motion between the king pin 18 and the towing vehicle upon receiving surge loads, as when braking the vehicle. It will thus be seen that the king pin locking member 23 is mounted for free pivotal movement from the locking position shown in FIGS. 2 and 3 to the uncoupling position shown in FIG. 4 as will be explained.

Mounted between the locking member and the rear end of the king pin opening 17 is a reciprocably movable locking wedge indicated at 28. The tapered surface 28ª of the wedge is adapted to engage with a corresponding tapered surface 23ª on the rear edge or side of the locking member 23. That is to say, when the wedge is in the coupled position the surfaces 28ª and 23ª are in engagement, whereby the king pin is locked within the seat of the locking member 23. An adjustable stop in the form of a bolt 29, secured by nuts 31, limits the movement of the wedge toward locking position.

As shown particularly in FIG. 6, pivotally mounted adjacent one end of the wedge, as at 32, is a wedge locking dog 33. As shown, the dog 33 lies immediately beneath the wedge 28. Mounted on one of the cross members 12 of the framework of the fifth wheel is a rack bar 34. The dog carries a detent 36 which is adapted to engage in the teeth of the rack bar 34, thus to lock the wedge in inward, coupled position as will later appear.

Laterally removed from the pivot point 32 and projecting downwardly from the lower surface of the dog 33 is a projection 37 which may be in the form of a stud 38 having a bushing 39 surrounding the same. The bushing 39 passes slidably through a slot 41 provided in an intermediate part of an operating handle indicated generally by the numeral 42. As shown in FIG. 2 the handle 42 passes loosely through a slot 44 in one of the cross members 12 of the framework in such fashion that the upper end 46 of the handle may move from the coupled position shown in FIG. 2 in full lines to the dotted line uncoupling position thereof. It will further be seen that the projection 37 extends all the way through the thickness of the handle 42. A safety pin type spring 47 has one end secured about the lower projecting end of the stud 38 and the other end is clipped about the side of the handle 42 as shown. The effect of the spring, therefore, is to urge the dog into a position with its detent engaging the teeth of the rack 34.

It is to be particularly noted that the length of the slot 41 is such that when the parts are in coupled position the lefthandmost end of the slot as viewed in FIG. 6 contacts the bushing 39, thus positively holding the detent 36 engaged with one of the teeth of the rack 34. However, enough lost motion is provided, by the length of the slot, to permit the detent to be raised to wedge unlocking position upon initial movement of the handle 42 toward uncoupling position, whenever the opposite end of the slot contacts the bushing 39 as will be explained.

In order to automate the opening and closing of the fifth wheel we provide a timer bar indicated generally at 48. As shown, this bar is pivotally connected at 49 to the operating handle 42. Further, the bar is in the same horizontal plane with the king pin locking member 23 and is provided adjacent its outer end with a notch 51 and intermediate its end with a cutout portion 52 on the same side. Welded or otherwise secured to the timer bar 48 is an arm 53. To the upper end of the arm 53 is secured one end of a strong coil tension spring 54, the other end of which is secured as at 56 to the frame of the fifth wheel. Thus, the arm 42 as well as the timer bar 48 are biased always toward coupling position by means of the spring 54. Further, the spring 54 tends to pivot the timer bar clockwise about the pivot 49 as viewed in FIGS. 2, 3, 4 and 5.

Figure 3:
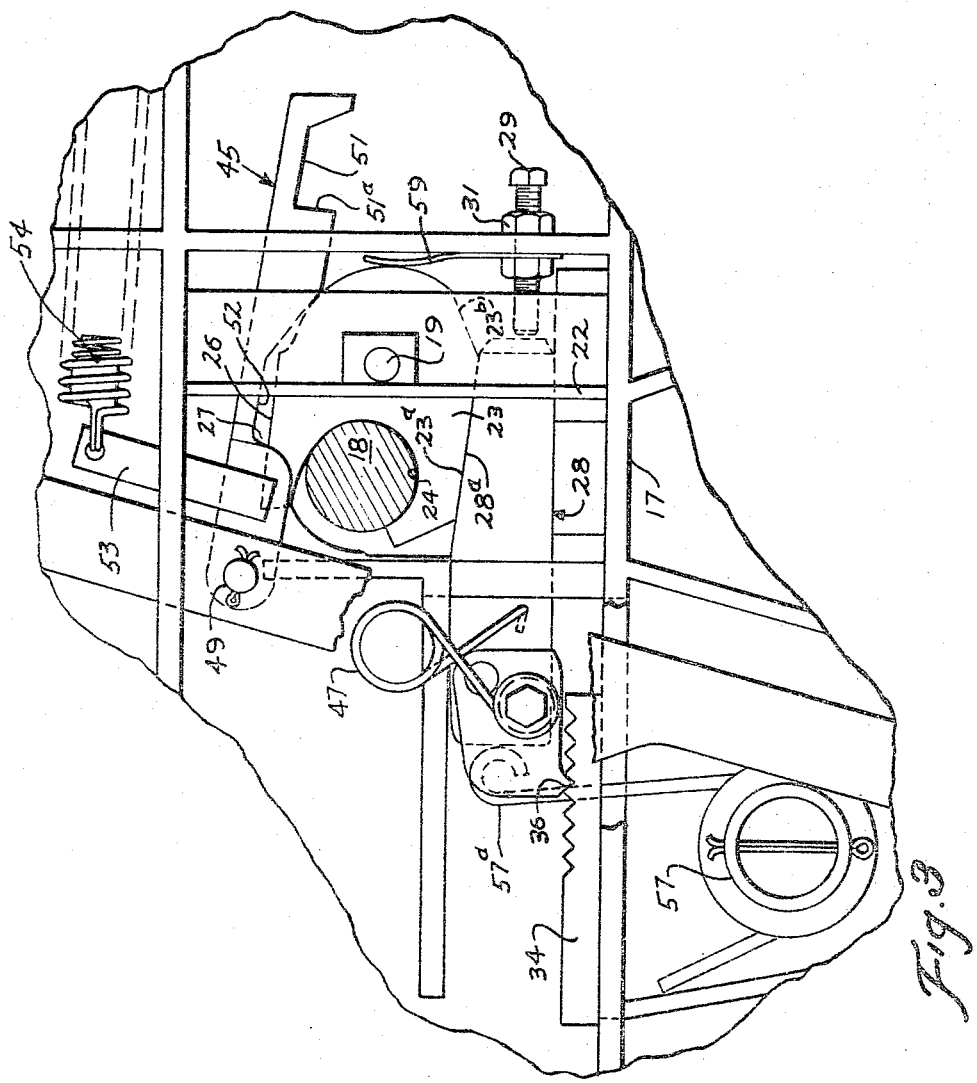
FIG. 3 is an enlarged, fragmental, underneath or bottom view and showing the parts in the fully locked position.
Figure 4:
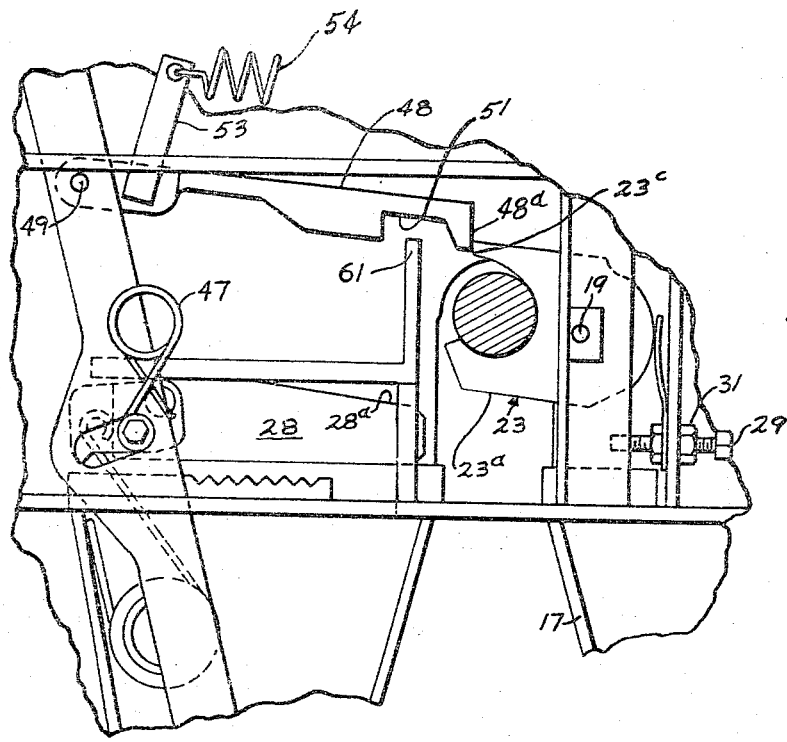
FIG. 4 is a view similar to FIG. 3 and showing the parts in the position which they occupy after the handle has been moved toward uncoupling position, and just prior to the king pin being removed from the fifth wheel.

Returning again to a description of the wedge 28, it will be seen that the wedge is biased always toward coupled position by means of a strong safety pin type spring 57, the upper arm 57ª of which bears against the outer end of the wedge, thus to push it to the right as viewed, for instance, in FIGS. 2 and 3.

Figure 5:
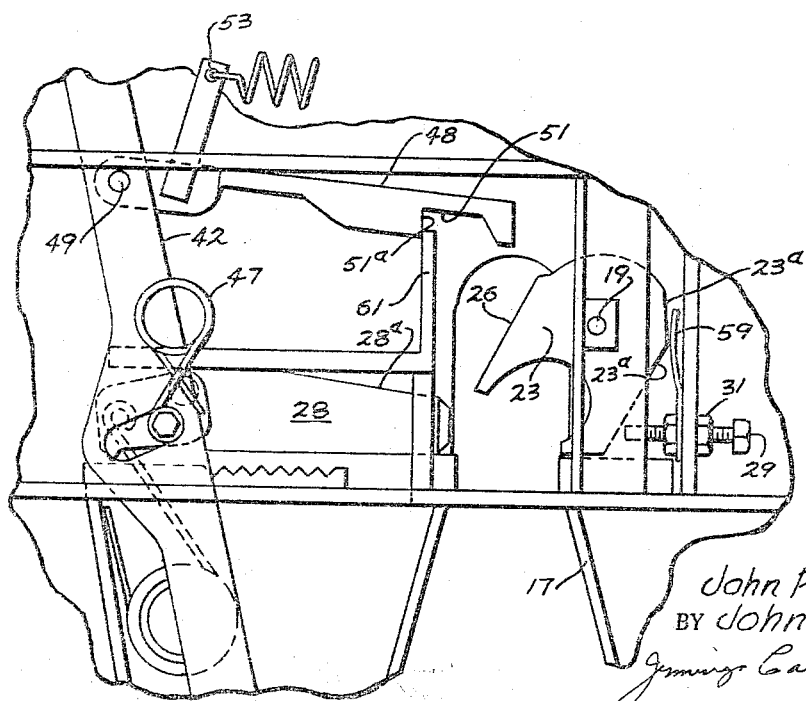
FIG. 5 is a view similar to FIGS. 3 and 4 and showing the position of the parts in uncoupled position, and illustrating particularly the function of the timer bar.

It will be understood that the pivotal connection at 19 for the locking member 23 is rather loose. Therefore, in order to prevent the locking member 23 from rattling when the tractor is being driven with no trailer attached thereto, we provide a flat place on the side of the locking member 23 as indicated at 23ᵇ. A small leaf spring 59 is mounted to bear against the side of the locking member 23 so that when the parts are in the uncoupled position as shown in FIG. 5 the spring effectively prevents rattling of the member 23. Further, the spring and flat place hold the locking member in king pin receiving position, ready for coupling as shown in FIG. 5.

Referring particularly to FIG. 5 of the drawing, it will be seen that the notch 51 in the outer end of the timer bar is disposed, when the parts are in the uncoupled position, for a wall 51ª thereof to rest against a side of an upstanding portion of the frame 61, thus to hold the entire mechanism in uncoupled position.

From the description so far given it is now possible more fully to explain the construction and operation of our improved fifth wheel. Starting with the parts in the position shown in FIG. 1, namely, the fully coupled, locked, towing position, it will be seen that the spring 54 is pulling the operating arm 42 to the right, namely, toward full locking position. The king pin 18 is thus effectively trapped in the seat 24 of the locking member 23, with its surface 23ª being engaged by the surface 28ª of the wedge 28, and being held against the stop 27. Further, the projection 37 on the locking dog 33 is being engaged by the lefthandmost side of the slot 41 in the arm 42, thus positively holding the detent 36 engaged with the rack 34. Still further, the strong spring 57 is forcing the wedge 28 into locking position.

Assuming now that it is desired to uncouple the mechanism, the operator grasps the outer end 46 of the handle 42, moving it to the left as viewed in the drawings. The first action is for the lefthandmost end of the slot 41 to move away from the detent 37 of the dog which passes therethrough. As soon as the righthandmost end of the slot 41 contacts the projection 37, the dog 33 is pivoted about the pivot point 32, raising the detent from engagement with the rack. Further continued leftward movement of the handle 42 moves the wedge 28 and timer bar 48 to the left, it being noted that the timer bar slides over the edge 26 of the locking member 23 and rises slightly during this leftward movement. As soon as the parts reach a position shown in FIG. 4 it will be seen that the notch 51 is located immediately above the projection 61 of the frame and that the end 48ª of the bar is engaging the end 23ᶜ of the king pin locking member 23. It will here be noted that the spring 54, being connected to the outer end of the arm 53 connected to the timer bar 48 tends to rotate the timer bar slightly clockwise as viewed in FIG. 4, during the unlocking or uncoupling motion. With the parts positioned as in FIG. 4, as soon as the vehicle to which the fifth wheel is attached moves forward, the king pin moves rearwardly, commencing its movement out of the slot 17. This causes rotation of the locking member 23 about its pivot 19, disengaging the ends 48ª and 23ᶜ, permitting the spring 54 thereby to pull the notch 51 of the timer bar 48 into such position that the surface 51ª of the notch engages the wall 51. As the fifth wheel unit carried by the towing vehicle moves forwardly the parts assume the position of FIG. 5. It will be noted again that the spring 59 engaging the flat surface 23ᵇ holds the locking member 23 with its seat facing the slot 17, ready to receive the king pin when the towing vehicle carrying the fifth wheel is backed into proper towing position.

Upon recoupling, the king pin engages in the member 23, rotating it about its pivot point 19, whereupon the upper flat surface thereof engages the outer end of the timer bar 48, raising the wall 51ª of notch 51 above the level of the wall 61. This frees the entire mechanism for the spring 54 to pull all of the parts back again into the position of FIG. 2, including the movement of the wedge and the resetting of the dog into the rack.

From the foregoing it will be apparent that we have devised an improved fifth wheel. It will be appreciated that our invention is particularly simple, free of structural complications and that it is extremely positive in operation. In actual practice we have found that our invention is a material improvement over existing fifth wheels known to us and that our improved apparatus involves a minimum number of working parts and hence a minimum amount of complications, both structurally and operationally.

While we have shown our invention in but one form, it will be obvious to those skilled in the art that it is not so limited, but is susceptible of various changes and modifications without departing from the spirit thereof, and we desired, therefore that only such limitations shall be placed thereupon as are specifically set forth in the appended claims.

What we claim is:
1. In a fifth wheel,
(a) a king pin locking member disposed for movement into and out of coupling position relative to a king pin,
(b) a wedge member movable into and out of engagement with one side of the locking member and when so engaged holding the locking member in coupled position,

(c) a wedge locking dog pivotally mounted on the wedge for movement into and out of wedge locking and wedge releasing positions and when in said locking position holding the wedge against the king pin locking member when the king pin locking member is in coupled position, (d) a handle for moving the wedge to unlocked position, and (e) means operable upon movement of the handle partially to unlocking position first operatively to connect a portion of the handle with the locking dog thereby to pivot the locking dog to wedge releasing position and upon continued movement to move the wedge to unlocked position.

2. In a fifth wheel, (a) a king pin locking member pivotally mounted for movement into and out of coupling position relative to a king pin, (b) a wedge slidable into position positively to hold the locking member in king pin coupled position and into another position disengaged from the king pin locking member, (c) a spring urging the wedge toward locking position, (d) a locking dog for the wedge pivotally mounted on the wedge, (e) a spring carried by the operating handle set forth in (f) below and urging the dog toward wedge locking position, and (f) an operating handle connected in lost motion fashion to the dog at a position thereon laterally of the dog mounting pivot, whereby upon movement of the handle toward uncoupling position the dog is positively engaged by the handle and pivoted against the force of the locking dog spring to wedge unlocking position prior to movement of the wedge toward said uncoupling position.

3. In a fifth wheel, (a) a king pin locking member pivotally mounted for swinging movement into and out of coupling position, (b) a shiftable wedge adapted when in one position to engage a side of the locking member when the latter is in coupled position and when shifted to another position to free the locking member for pivotal movement for uncoupling, (c) a locking dog for the wedge pivoted thereto and disposed when in locked position positively to hold the wedge against movement from its coupled position to uncoupling position, (d) means urging the wedge and dog members toward coupled and locking positions, respectively, (e) a manually operable handle having an intermediate portion movable into and out of coupling and uncoupling positions, there being an elongated slot in the intermeditae portion of the handle, and (f) a projection on the dog located laterally of the point of pivotal connection of the dog to the wedge and slidably received by the slot in said handle, whereby upon pivotal movement of the handle from coupled toward uncoupling positions the dog is pivoted, against the force of the means urging it to locking position, to unlocked position prior to movement of the wedge toward uncoupling position.

4. A fifth wheel as defined in claim 3 in which the length of said slot is such that when the handle is in coupled position the dog is positively held in locked position by engagement of an end of said slot with the projection on the dog.

5. A fifth wheel as defined in claim 3 in which there is a timer bar movable by the handle and effective releasably to hold the king pin locking member in coupled position upon movement of the handle to uncoupling position.

References Cited by the Examiner

UNITED STATES PATENTS

| | | | |
|---|---|---|---|
| 2,726,878 | 12/1955 | Fontaine | 280—434 |
| 2,885,222 | 5/1959 | Walther et al. | 280—436 |
| 3,056,612 | 10/1962 | Slaven | 280—434 |
| 3,063,738 | 11/1962 | Becker | 280—434 |
| 3,224,788 | 12/1965 | Steinway | 280—434 |

LEO FRIAGLIA, *Primary Examiner.*